United States Patent
Zafiris et al.

(10) Patent No.: US 10,837,295 B2
(45) Date of Patent: Nov. 17, 2020

(54) FAN BLADE ASSEMBLY

(71) Applicant: UNITED TECHNOLOGIES CORPORATION, Farmington, CT (US)

(72) Inventors: Georgios S. Zafiris, Glastonbury, CT (US); Mark R. Jaworowski, Glastonbury, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 271 days.

(21) Appl. No.: 16/390,875

(22) Filed: Apr. 22, 2019

(65) Prior Publication Data

US 2020/0024978 A1 Jan. 23, 2020

Related U.S. Application Data (63) Continuation of application No. 15/023,563, filed as application No. PCT/US2014/055479 on Sep. 12, 2014, now Pat. No. 10,267,165.

(60) Provisional application No. 61/883,774, filed on Sep. 27, 2013.

(51) Int. Cl.
| | |
|---|---|
| *F01D 5/28* | (2006.01) |
| *F01D 5/14* | (2006.01) |
| *F04D 29/02* | (2006.01) |
| *F04D 29/32* | (2006.01) |

(52) U.S. Cl.
CPC .............. *F01D 5/288* (2013.01); *F01D 5/147* (2013.01); *F04D 29/023* (2013.01); *F04D 29/324* (2013.01); *F05D 2240/303* (2013.01); *F05D 2260/95* (2013.01); *F05D 2300/10* (2013.01); *F05D 2300/611* (2013.01); *Y02T 50/672* (2013.01)

(58) Field of Classification Search
CPC ... F01D 5/14; F01D 5/147; F01D 5/28; F01D 5/284; F01D 5/286; F01D 5/288; F04D 29/023; F04D 29/324; F04D 29/38; F04D 29/388; F05D 2240/303; F05D 2260/95; F05D 2300/10; F05D 2300/611; Y02T 50/672
See application file for complete search history.

(56) References Cited

U.S. PATENT DOCUMENTS

| | | | |
|---|---|---|---|
| 3,148,954 A | 9/1964 | Haas | |
| 2009/0176110 A1* | 7/2009 | Pabla | .................. C23C 28/3455 428/450 |

(Continued)

OTHER PUBLICATIONS

EP Office Action for Application No. 14 847 913.2; dated Apr. 14, 2020.

(Continued)

*Primary Examiner* — Courtney D Heinle
*Assistant Examiner* — Sang K Kim
(74) *Attorney, Agent, or Firm* — Cantor Colburn LLP (57) ABSTRACT

The present disclosure relates generally to a fan blade assembly. In an embodiment, the fan blade assembly includes an airfoil having a forward edge covered by a sheath. The airfoil and the sheath are made from dissimilar conductive materials. A sacrificial anode layer is applied to at least a portion of the sheath so that the sacrificial anode layer will corrode instead of the airfoil.

20 Claims, 7 Drawing Sheets

(56) References Cited

U.S. PATENT DOCUMENTS

| | | | |
|---|---|---|---|
| 2010/0226783 A1* | 9/2010 | Lipkin | C23C 30/00 |
| | | | 416/241 B |
| 2011/0033308 A1 | 2/2011 | Huth et al. | |
| 2011/0211967 A1* | 9/2011 | Deal | F01D 5/147 |
| | | | 416/224 |
| 2012/0152893 A1 | 6/2012 | Parkos | |
| 2012/0189425 A1* | 7/2012 | Moors | C23F 13/06 |
| | | | 415/1 |
| 2013/0004323 A1 | 1/2013 | Hansen | |
| 2013/0199934 A1 | 8/2013 | Parkos, Jr. | |
| 2015/0308275 A1* | 10/2015 | Pabla | B05D 1/36 |
| | | | 428/142 |
| 2016/0208813 A1 | 7/2016 | Zafiris et al. | |
| 2016/0230594 A1* | 8/2016 | Yamauchi | C25D 7/008 |
| 2018/0202299 A1* | 7/2018 | Murdock | F01D 5/3092 |
| 2020/0157691 A1* | 5/2020 | Gani | B24C 3/322 |

OTHER PUBLICATIONS

European Search Report for Applicaiton EP 14 84 7913.
PCT International Search Report for International Application No. PCT/US2014/055479; International Filing Date: Sep. 12, 2014; dated Dec. 22, 2014; 3 pgs.
PCT Written Opinion for International Application No. PCT/US2014/055479; International Filing Date: Sep. 12, 2014; dated Dec. 22, 2014; 11 pgs.

* cited by examiner

FAN BLADE ASSEMBLY

CROSS-REFERENCE TO RELATED APPLICATIONS

This application is a continuation of U.S. patent application Ser. No. 15/023,563 filed on Mar. 21, 2016, which is a U.S. National Stage of PCT Application No. PCT/US2014/055479 filed on Sep. 12, 2014, which claims priority to U.S. Provisional Patent Application No. 61/883,774 filed on Sep. 27, 2013, the contents each of which are incorporated herein by reference thereto

TECHNICAL FIELD OF THE DISCLOSURE

The present disclosure is generally related to rotating assemblies for turbomachinery and, more specifically, to a fan blade assembly.

BACKGROUND OF THE DISCLOSURE

In a turbofan engine, lighter components generally lead to more efficient performance. If less energy is expended to move internal engine parts, more energy is available for useful work. At the same time, the components themselves must be strong enough to withstand operational forces, and types of failure typical for the operating environment of the engine. Safety considerations and regulations based on the frequency and/or severity of possible failure will often dictate that the engine components also be able to withstand other atypical, yet foreseeable events. Because stronger and lighter components are often more expensive, a balance must be struck between efficiency, safety, and cost.

Few locations in an aircraft are more representative of efforts to optimize the balance between efficiency, safety, and cost than the engine. While lighter materials are preferable to improve efficiency, the high risk of severe consequences from engine damage will require that the engine be made of components having additional margins of safety. Combining parts having both high strength and low density greatly restricts material choices and increases costs. Not infrequently, processing these strong and light materials such as titanium or composites is also complex and expensive.

Being designed to pull vast quantities of air through the bypass section to generate thrust, blades in the fan section of the engine are the first line of defense for the engine and are highly susceptible to both small and large scale damage from objects pulled in with the surrounding air, including bird impact damage.

Small scale blade damage causes performance deterioration and increases the number of potential crack initiation sites, while large scale damage includes blade deformation and failure. Small impacts can also lead to large scale damage by serving as crack initiation sites. Larger impacts, such as ingestion of birds can cause one or more blades to deform or break in a single event. Regulations are in place to limit the frequency and severity of single event failures because of the increased risk of emergency landings and catastrophic failure.

Blades made entirely from high-strength materials, such as titanium or titanium alloys to name just two non-limiting examples, have been proven to offer sufficient hardness to resist erosion and foreign object damage. But titanium alloys are often expensive to purchase and manipulate into a finished blade. And while titanium has a relatively low density compared to a number of metals, the weight of titanium fan blades are significant contributors to overall engine weight. Fiber composites offer significant weight savings relative to titanium and its alloys, but are far more expensive and do not offer the same resiliency.

One technique of reducing the weight of a blade is to use a lower-density metallic material for the airfoil body. As described earlier, composite blades are extremely light, but are far more complex and expensive to produce relative to titanium blades. Small composite blades do not generally achieve sufficient weight savings to merit the additional complexity and cost.

Forming the blade from a lightweight metallic material can reduce cost and weight over a titanium blade. But without additional support or reinforcement, airfoils made solely from most lightweight metals or alloys do not offer sufficient strength and longevity for long-term use.

Multi-material assembled fan blades, consisting of, but not limited to, a sheath and a blade body made of dissimilar conductive materials, such as metals and/or composites, create a galvanic potential. Currently, a non-conductive adhesive is used to bond the sheath to the blade. The non-conductive adhesive therefore provides an insulative layer that prevents the flow of electrons in the potential galvanic current. This adhesive can have gaps in coverage, or a point contact between the sheath and the blade body can occur upon extended field operation, allowing electrons to flow between the two dissimilar materials, which can potentially lead to corrosion.

Various designs for providing a sheath for use on a fan blade have been proposed, but improvements are still needed in the art.

SUMMARY OF THE DISCLOSURE

In one embodiment, a fan blade assembly is disclosed, comprising: a conductive airfoil; a conductive sheath including an outer surface; and a sacrificial anode layer disposed on at least a portion of the sheath outer surface; wherein the sacrificial anode layer is more anodic than the conductive airfoil; and wherein the airfoil is bonded to the sheath.

In another embodiment, a fan blade assembly is disclosed, comprising: a conductive airfoil; a conductive sheath including an outer surface; and a sacrificial anode layer disposed on at least a portion of the conductive airfoil; wherein the sacrificial anode layer is more anodic than the conductive airfoil; and wherein the airfoil is joined to the sheath.

Other embodiments are also disclosed.

BRIEF DESCRIPTION OF THE DRAWINGS

The embodiments and other features, advantages and disclosures contained herein, and the manner of attaining them, will become apparent and the present disclosure will be better understood by reference to the following description of various exemplary embodiments of the present disclosure taken in conjunction with the accompanying drawings, wherein.

DETAILED DESCRIPTION OF THE DISCLOSED EMBODIMENTS

For the purposes of promoting an understanding of the principles of the invention, reference will now be made to certain embodiments and specific language will be used to describe the same. It will nevertheless be understood that no limitation of the scope of the invention is thereby intended, and alterations and modifications in the illustrated device, and further applications of the principles of the invention as illustrated therein are herein contemplated as would normally occur to one skilled in the art to which the invention relates.

Figure 1:
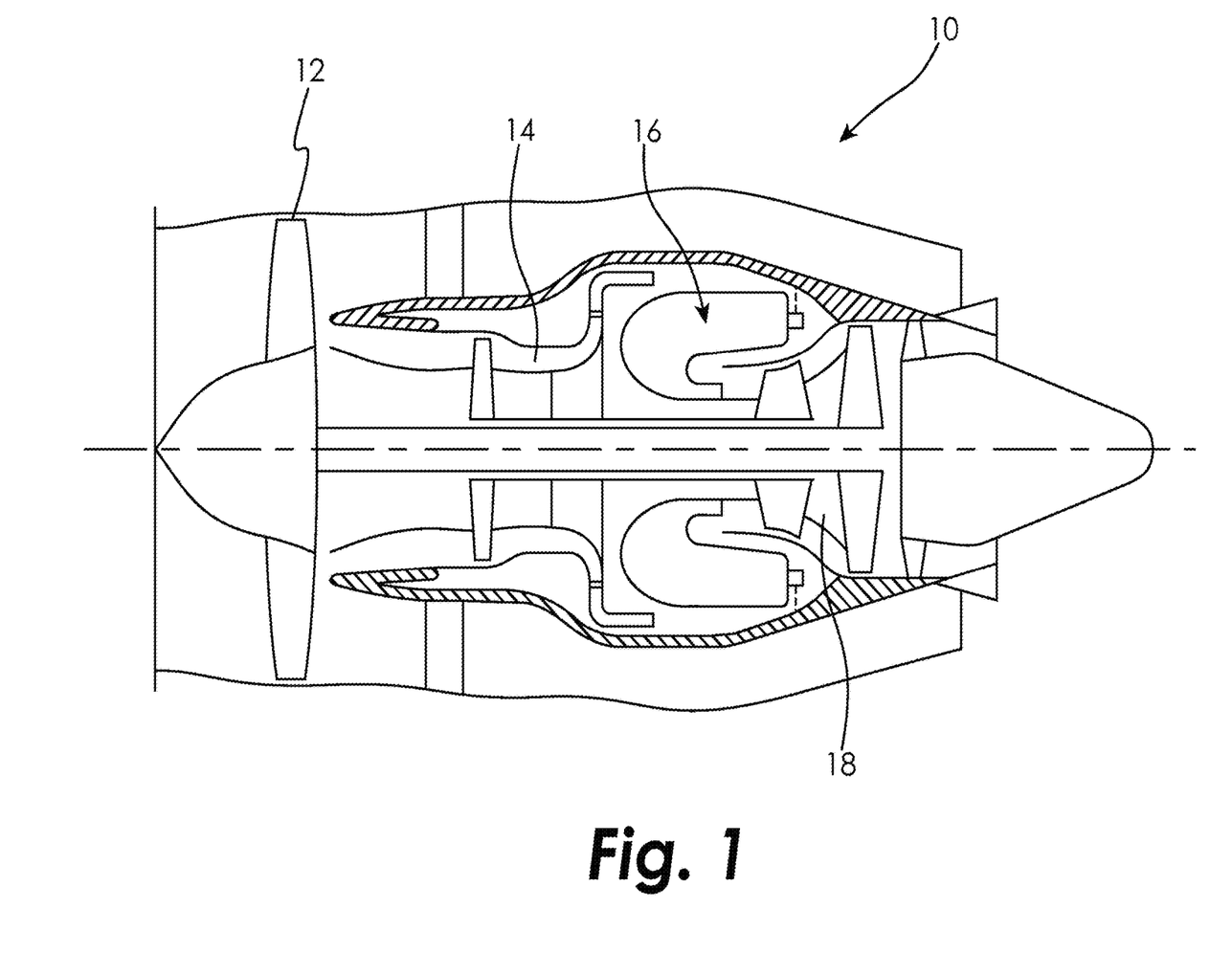
FIG. 1 is a schematic cross-sectional view of a gas turbine engine.

FIG. 1 illustrates a gas turbine engine 10 of a type normally provided for use in a subsonic flight, generally comprising in serial flow communication a fan section 12 through which ambient air is propelled, a compressor section 14 for pressurizing a portion of the air (the gas path air), a combustor 16 in which the compressed air is mixed with fuel and ignited for generating a stream of hot combustion gases, and a turbine section 18 for extracting energy from the combustion gases. Although a gas turbine engine is discussed herein as an illustrative example, the presently disclosed embodiments are applicable to sheathed blades in other applications, such as sheaths for aircraft propellers, helicopter rotor blades, and fan blades for air circulation and treatment systems in industrial and residential applications, to name just a few non-limiting examples.

Figure 2:
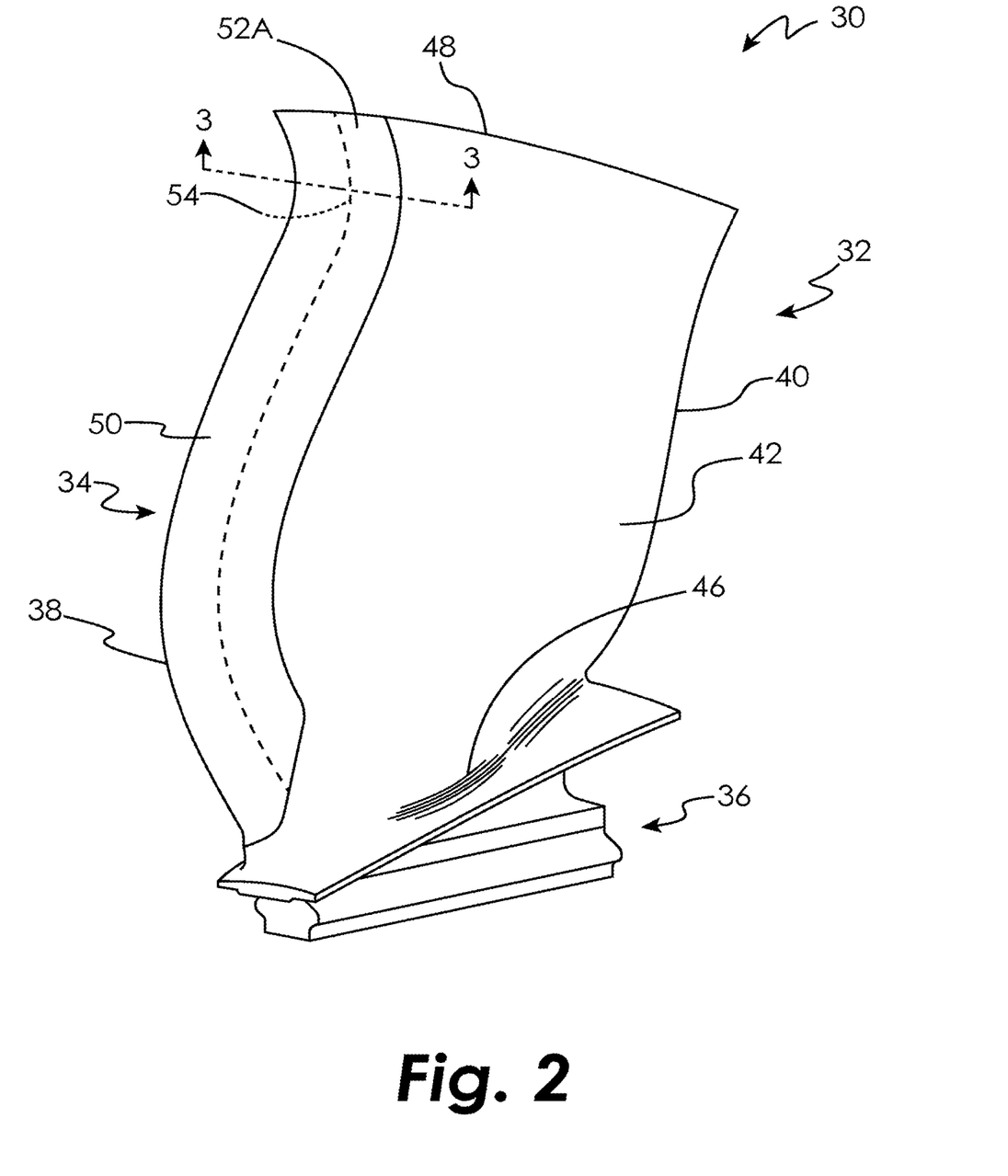
FIG. 2 is a schematic perspective view of a fan blade assembly in an embodiment.

A side view of exemplary fan blade assembly 30 is shown in FIG. 2, which includes cross section 3-3. As seen in FIG. 2, three parts form fan blade assembly 30: airfoil 32, sheath 34, and root 36. Root 36 can optionally be an integral part of the forging that comprises the root and blade airfoil 32. Blade 30 has leading edge 38, trailing edge 40, and suction surface 42. Fan blade assembly 30 also includes platform 46, tip edge 48, sheath head section 50, sheath flank 52A, and forward airfoil edge 54. Pressure surface 44 and sheath flank 52B are at the rear of blade 30 (not visible; shown in FIG. 3).

Leading edge 38 and trailing edge 40 extend generally spanwise in a curved manner from platform 46 to tip edge 48. Air flows chordwise from leading edge 38 over suction surface 42 and pressure surface 44, meeting at trailing edge 40. Root 36 links fan blade assembly 30 at platform 46 to a disk or rotor (not shown) in fan section 12. Here root 36 is shown as a "dovetail" root; however, such an arrangement is not required in the present embodiments. Alternatively, fan blade assembly 30 can have a different configuration of root 36, or root 36 can be incorporated with the disk in what is known in the art as an integral rotor blade configuration.

Sheath 34 covers a portion of airfoil 32 proximal forward airfoil edge 54, extending spanwise over at least a part of the length of leading edge 38 between platform 46 and tip edge 48. Forward airfoil edge 54 is represented by a broken line extending spanwise along sheath 34. It has been found that adding protective sheath 34 over forward airfoil edge 54 of lightweight airfoil 32 can prevent a significant amount of such damage and slow degradation of fan blade assembly 30.

Figure 3:
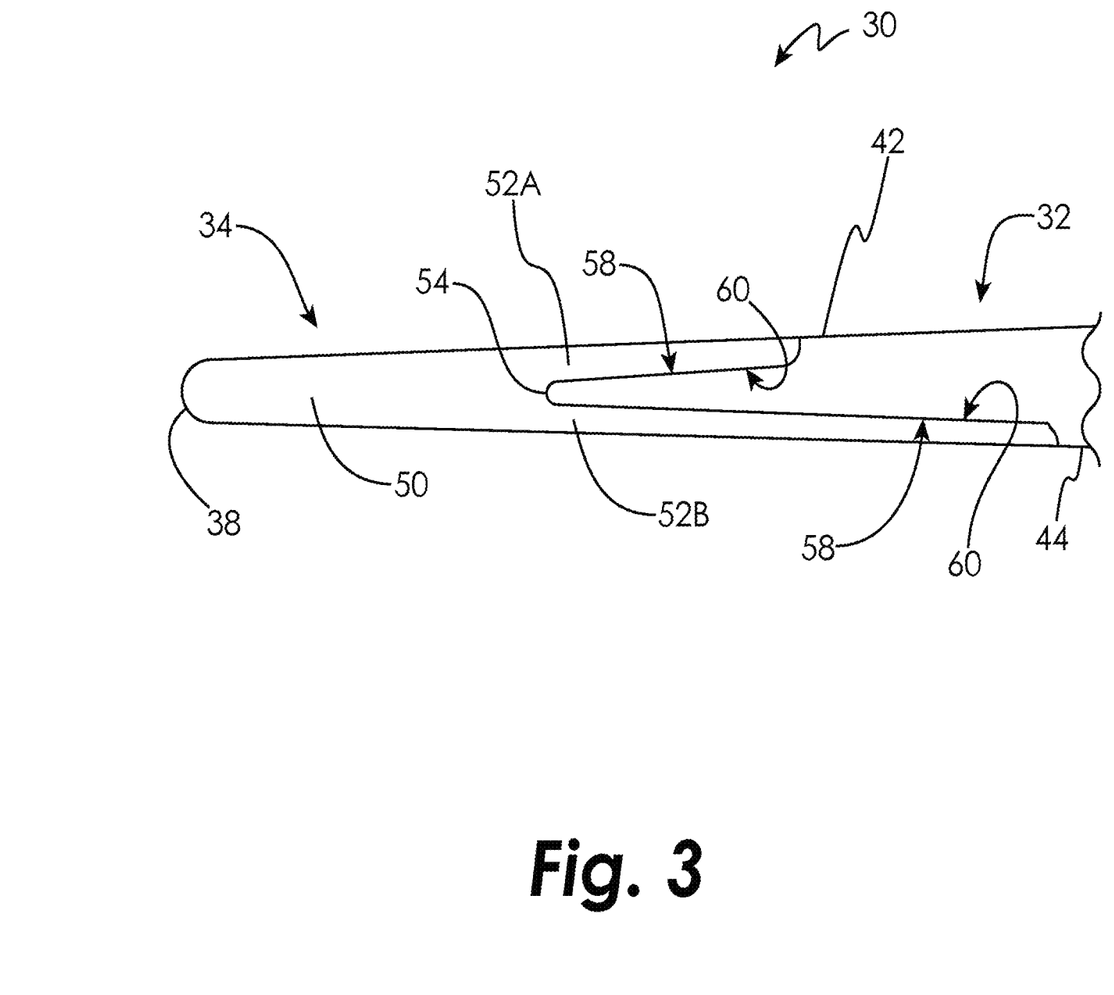
FIG. 3 is a schematic cross-sectional view of the fan blade assembly of FIG. 2 in an embodiment.

FIG. 3 depicts a partial cross-section of fan blade assembly 30 in an embodiment, taken across line 3-3 of FIG. 2. Fan blade assembly 30 includes airfoil 32, sheath 34, leading edge 38, suction surface 42, pressure surface 44, sheath head section 50, sheath flanks 52A and 52B, airfoil forward edge 54, and sheath receiving surface 58 on the airfoil 32 and a corresponding airfoil contact surface 60 on the sheath 34.

Sheath receiving surface 58 is located on airfoil 32 proximate leading edge 38 and includes a portion of suction surface 42 and pressure surface 44. Flanks 52A and 52B extend back from head section 50 over portions of suction surface 42 and pressure surface 44 proximate leading edge 38. A nonconductive adhesive covers the sheath receiving surface 58/airfoil contact surface 60 to bond the sheath 34 to the airfoil 32.

Figure 4:
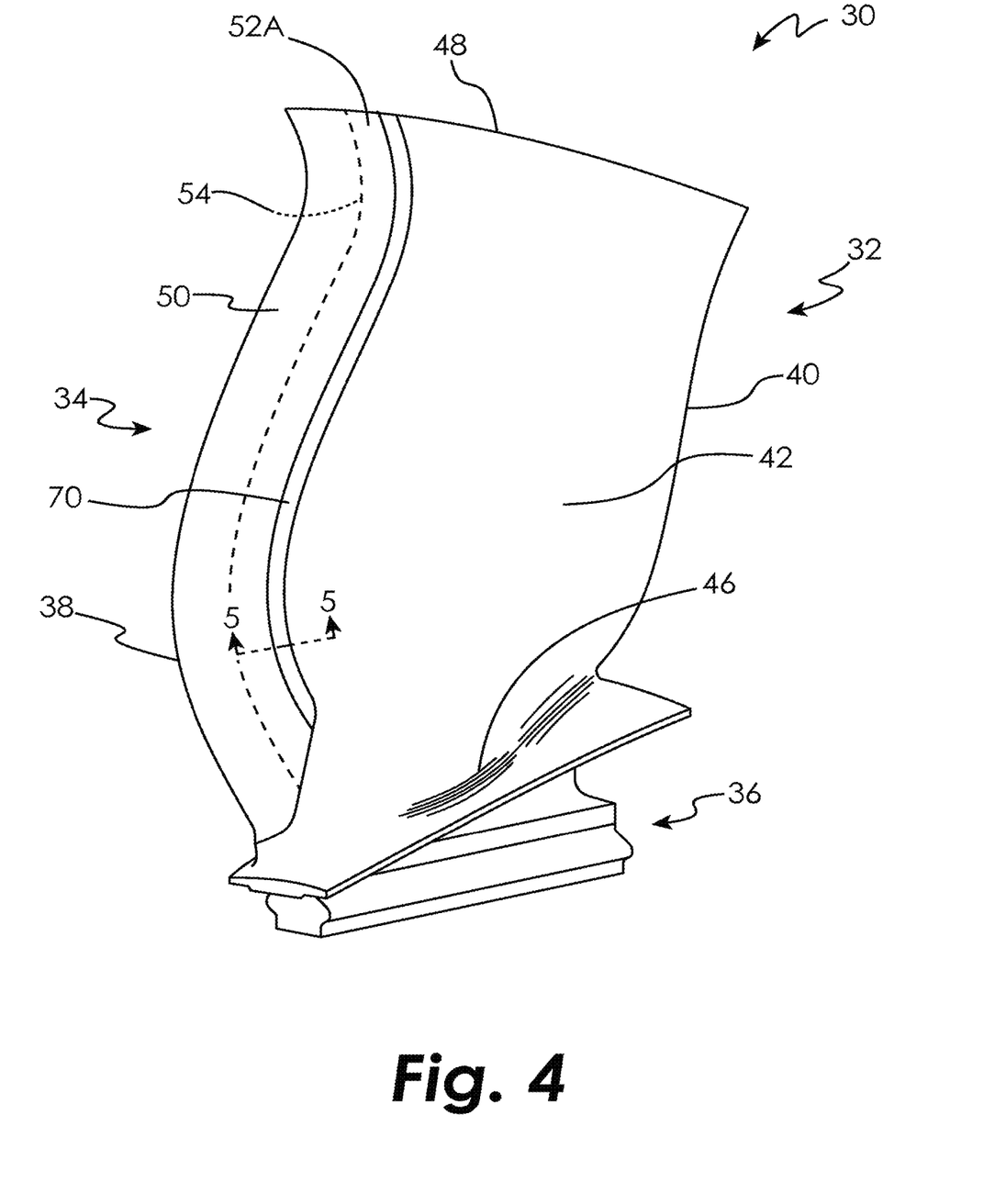
FIG. 4 is a schematic perspective view of a fan blade assembly in an embodiment.
Figure 5:
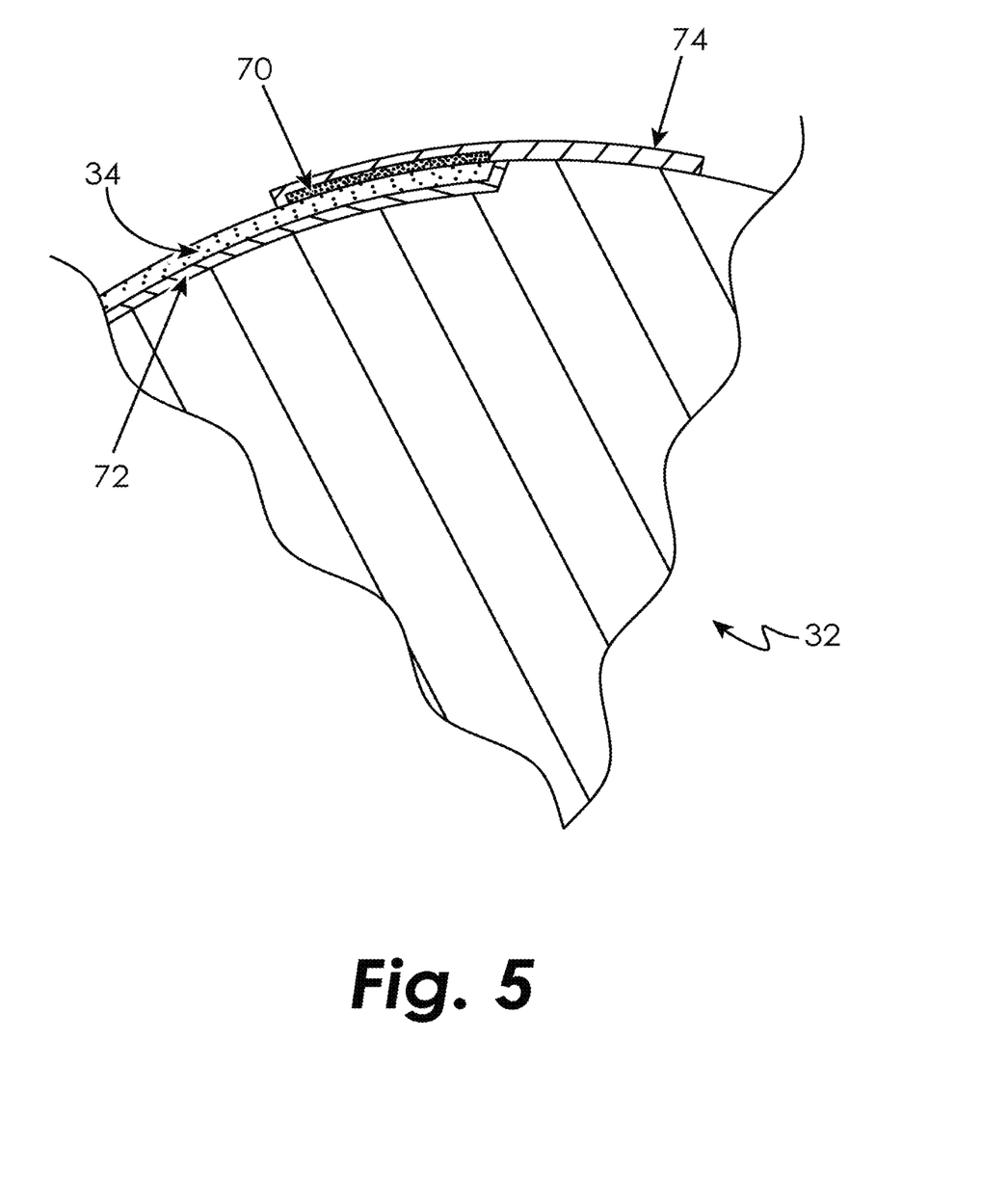
FIG. 5 is a schematic cross-sectional view of the fan blade assembly of FIG. 4 in an embodiment.

It is at the sheath receiving surface 58/airfoil contact surface 60 that the possibility of a galvanic potential arises. If there is a gap in coverage of the nonconductive adhesive that covers the sheath receiving surface 58/airfoil contact surface 60, then a galvanic potential will be created between the dissimilar materials of the airfoil 32 and sheath 34 and corrosion will occur. Therefore, as shown in FIGS. 4 and 5, a sacrificial anode layer 70 is applied to the sheath 34 in an embodiment for mitigating the aluminum airfoil 32 galvanic corrosion risk. In an embodiment, the sacrificial anode layer 70 may comprise a metal layer (more anodic than the material of the airfoil 32, thus preferentially corroding instead of the airfoil 32) that is applied onto at least an external perimeter of the sheath at a predetermined layer width. In an embodiment, the predetermined layer width may comprise approximately ¼ inch, but any width may be used, including application of the sacrificial anode layer 70 to the entire sheath 34.

The sacrificial anode layer 70 material may comprise any material that is more anodic than the material of the airfoil 32. For example, if the airfoil 32 is formed from an aluminum alloy, the sacrificial anode layer 70 material may comprise zinc, zinc alloys, electrochemically active aluminum alloys, magnesium, magnesium alloys, zinc and/or magnesium alloys with aluminum (e.g. ZnMgAl alloy, ZnAl alloy, etc), and pure aluminum, cadmium, beryllium and their alloys, and alloys of any of the above elements. The active aluminum alloy can be tailored to match the anodic potential of zinc, and thus be anodic compared to the airfoil 32 aluminum alloys. The galvanic potential difference between the sacrificial anode layer 70 made from the above materials and the aluminum alloy of the airfoil 32 ranges in absolute values between greater than 0 mV to approximately 2000 mV in an embodiment, depending on the exact composition of the sacrificial anode layer 70 material. In another embodiment, the galvanic potential difference ranges in absolute values between greater than 0 mV to approximately 1000 mV, depending on the exact composition of the sacrificial anode layer 70 material. Any measurable anodic galvanic potential difference will provide the thermodynamic driving force needed to protect the aluminum alloy of the airfoil 32. The resulting galvanic current density, which is a measure of the sacrificial anode material's dissolution rate (and therefore the duration of the anodic protection), ranges between approximately 1 $\mu A/cm^2$ and approximately 10 $\mu A/cm^2$ in an embodiment.

As shown in FIG. 5, the sheath 34 is bonded to the airfoil 32 by any desired bonding agent 72, such as an epoxy composite adhesive, to name just one non-limiting example. The sacrificial anode layer 70 is disposed on the outer surface of the sheath 34 adjacent the airfoil 32. The sacrificial anode layer 70 is applied to any desired thickness and the thickness may be non-uniform across the layer 70. In an embodiment, the sacrificial anode layer 70 is applied to a thickness of approximately 0.001 inch to approximately 0.05 inch on the sheath 34 while providing sufficient sacrificial protection to the airfoil 32. Any desired application/deposition technique may be used, including cold-spray, thermal (flame or arc) spray, electro-deposition, as well as conventional coating application methods such as airbrush, spray, etc. It will be appreciated that the application/deposition technique employed to apply the sacrificial anode layer is not critical.

The sacrificial anode layer 70 may then optionally be coated with an erosion protection coating 74 to provide erosion protection, as well as insulation to suppress the galvanic couple between the sacrificial anode layer 70 and the airfoil 32 surface that is not due to a gap in the bonding agent 72. The sacrificial anode layer 70 may additionally be colored (formulated as a colored composition or colored during its deposition/application) to act as a visual corrosion risk indicator that can be easily monitored during routine engine checks and maintenance. When the erosion protection coating 74 wears away, the exposed colored sacrificial anode layer 70 provides a distinct visual indication of needed maintenance, in addition to providing sufficient galvanic corrosion protection to the airfoil 32 until the maintenance action is taken.

Figure 6:
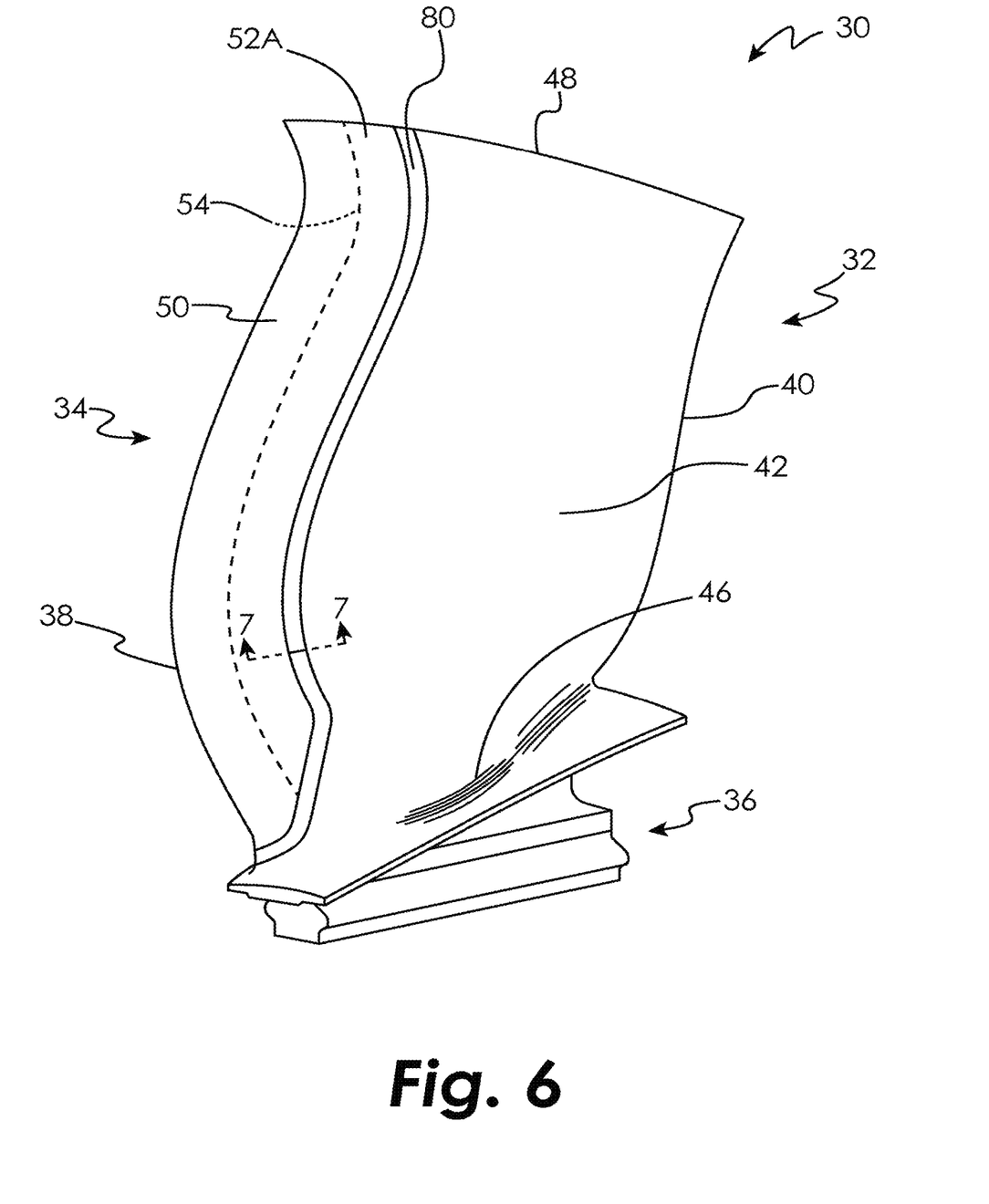
FIG. 6 is a schematic perspective view of a fan blade assembly in an embodiment.
Figure 7:
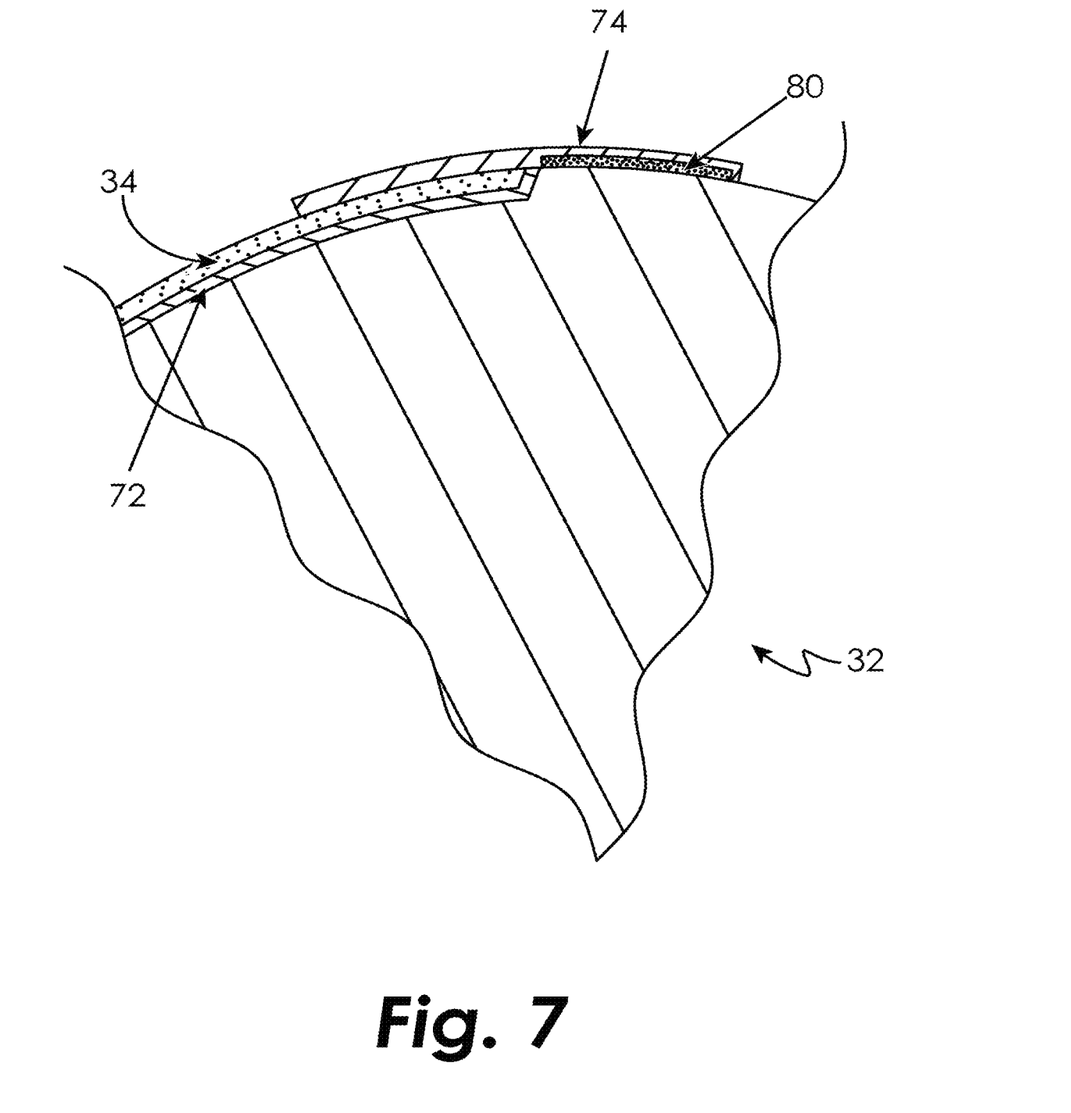
FIG. 7 is a schematic cross-sectional view of the fan blade assembly of FIG. 6 in an embodiment.

As shown in FIGS. 6 and 7, a sacrificial anode layer 80 may be disposed on at least a portion of the airfoil 32 outer surface adjacent to the sheath 34 in addition to, or instead of, being disposed onto the sheath 34 outer surface. In an embodiment, the sacrificial anode layer 80 may comprise a metal layer (more anodic than the material of the airfoil 32, thus preferentially corroding instead of the airfoil 32) that is applied onto at least the airfoil 32 outer surface at a predetermined layer width. In an embodiment, the predetermined layer width may comprise approximately ¼ inch, but any width may be used, including application of the sacrificial anode layer 80 to the entire airfoil 32.

The sacrificial anode layer 80 material may comprise any material that is more anodic than the material of the airfoil 32. For example, if the airfoil 32 is formed from an aluminum alloy, the sacrificial anode layer 80 material may comprise zinc, zinc alloys, electrochemically active aluminum alloys, magnesium, magnesium alloys, zinc and/or magnesium alloys with aluminum (e.g. ZnMgAl alloy, ZnAl alloy, etc), and pure aluminum, cadmium, beryllium and their alloys, and alloys of any of the above elements. The active aluminum alloy can be tailored to match the anodic potential of zinc, and thus be anodic compared to the airfoil 32 aluminum alloys. The galvanic potential difference between the sacrificial anode layer 80 made from the above materials and the aluminum alloy of the airfoil 32 ranges in absolute values between greater than 0 mV to approximately 2000 mV in an embodiment, depending on the exact composition of the sacrificial anode layer 80 material. In another embodiment, the galvanic potential difference ranges in absolute values between greater than 0 mV to approximately 1000 mV, depending on the exact composition of the sacrificial anode layer 80 material. Any measurable anodic galvanic potential difference will provide the thermodynamic driving force needed to protect the aluminum alloy of the airfoil 32. The resulting galvanic current density, which is a measure of the sacrificial anode material's dissolution rate (and therefore the duration of the anodic protection), ranges between approximately 1 $\mu A/cm^2$ and approximately 10 $\mu A/cm^2$ in an embodiment.

The sacrificial anode layer 80 is applied to any desired thickness and the thickness may be non-uniform across the layer 80. Any desired application/deposition technique may be used, including cold-spray, thermal (flame or arc) spray, electro-deposition, as well as conventional coating application methods such as airbrush, spray, etc. It will be appreciated that the application/deposition technique employed to apply the sacrificial anode layer is not critical.

The sacrificial anode layer 80 may then optionally be coated with an erosion protection coating 74 to provide erosion protection. The sacrificial anode layer 80 may additionally be colored (formulated as a colored composition or colored during its deposition/application) to act as a visual corrosion risk indicator that can be easily monitored during routine engine checks and maintenance. When the erosion protection coating 74 wears away, the exposed colored sacrificial anode layer 80 provides a distinct visual indication of needed maintenance, in addition to providing sufficient galvanic corrosion protection to the airfoil 32 until the maintenance action is taken.

While the invention has been illustrated and described in detail in the drawings and foregoing description, the same is to be considered as illustrative and not restrictive in character, it being understood that only certain embodiments have been shown and described and that all changes and modifications that come within the spirit of the invention are desired to be protected.

What is claimed is:

1. A method of forming a fan blade assembly, comprising:
   providing a conductive airfoil;
   providing a conductive sheath including an outer surface;
   applying a sacrificial anode layer only on at least a portion of the outer surface of the sheath or only on a portion of the conductive airfoil, wherein the sacrificial anode layer is formulated as a colored composition or colored during application in order to provide a visual corrosion risk indicator;
   coating the sacrificial anode layer, the conductive airfoil and the conductive sheath with an erosion protection coating, wherein when the sacrificial anode layer wears away the sacrificial anode layer provides a distinct visual indication;
   wherein the sacrificial anode layer is more anodic than the conductive airfoil; and
   wherein the conductive airfoil is joined to the sheath and the sacrificial anode layer corrodes instead of the conductive airfoil when a galvanic potential is created between the conductive airfoil and the sheath.

2. The method of claim 1, wherein the conductive sheath is joined to the conductive airfoil with a nonconductive adhesive.

3. The method of claim 1, wherein the conductive airfoil is formed from an aluminum alloy.

4. The method of claim 1, wherein the conductive sheath is formed from titanium or titanium alloys.

5. The method of claim 1, wherein:
   the conductive airfoil further includes an airfoil forward edge, a pressure side and a suction side;
   the conductive sheath further includes a sheath head section and first and second flanks extending from the sheath head section; and
   wherein the conductive sheath covers at least a portion of the airfoil forward edge, the first flank covers at least a portion of the suction side, and the second flank covers at least a portion of the pressure side.

6. The method of claim 1, wherein the fan blade assembly comprises a portion of a gas turbine engine.

7. The method of claim 1, wherein the sacrificial anode layer is disposed on a perimeter of the sheath outer surface at a predetermined sacrificial anode layer width.

8. The method of claim 7, wherein the sacrificial anode layer width comprises approximately ¼ inch.

9. The method of claim 1, wherein the sacrificial anode layer comprises a material selected from the group consisting of: zinc, zinc alloy, electrochemically active aluminum alloy, magnesium, magnesium alloy, zinc and aluminum alloy, magnesium and aluminum alloy, zinc and magnesium alloys with aluminum, aluminum, cadmium, beryllium and alloys of aluminum, cadmium, and beryllium, and alloys of any of the above.

10. The method of claim 1, wherein the galvanic potential difference between the sacrificial anode layer and the conductive airfoil is in absolute values between greater than 0 mV and approximately 2000 mV.

11. The method of claim 10, wherein the galvanic potential difference between the sacrificial anode layer and the conductive airfoil is in absolute values between greater than 0 mV and approximately 1000 mV.

12. The method of claim 1, wherein the galvanic current density between the sacrificial anode layer and the conductive airfoil is between approximately 1 $\mu A/cm^2$ and approximately 10 $\mu A/cm^2$.

13. The method of claim 1, wherein the sacrificial anode layer comprises a thickness of approximately 0.001 inch to approximately 0.05 inch.

14. The method of claim 1, wherein the sacrificial anode layer comprises a first color different than a second color of the conductive airfoil.

15. The method of claim 14, wherein the sacrificial anode layer is disposed on a perimeter of the sheath outer surface at a predetermined sacrificial anode layer width.

16. The method of claim 14, wherein the conductive airfoil is formed from an aluminum alloy.

17. The method of claim 16, wherein the conductive sheath is formed from titanium or titanium alloys.

18. The method of claim 17, wherein the sacrificial anode layer comprises a thickness of approximately 0.001 inch to approximately 0.05 inch.

19. The method of claim 14, wherein the sacrificial anode layer comprises a thickness of approximately 0.001 inch to approximately 0.05 inch.

20. The method of claim 14, wherein the conductive sheath is joined to the conductive airfoil with a nonconductive adhesive.

* * * * *